(No Model.)  5 Sheets—Sheet 1.
E. W. WOODRUFF.
BILL FILE.
No. 569,700.  Patented Oct. 20, 1896.
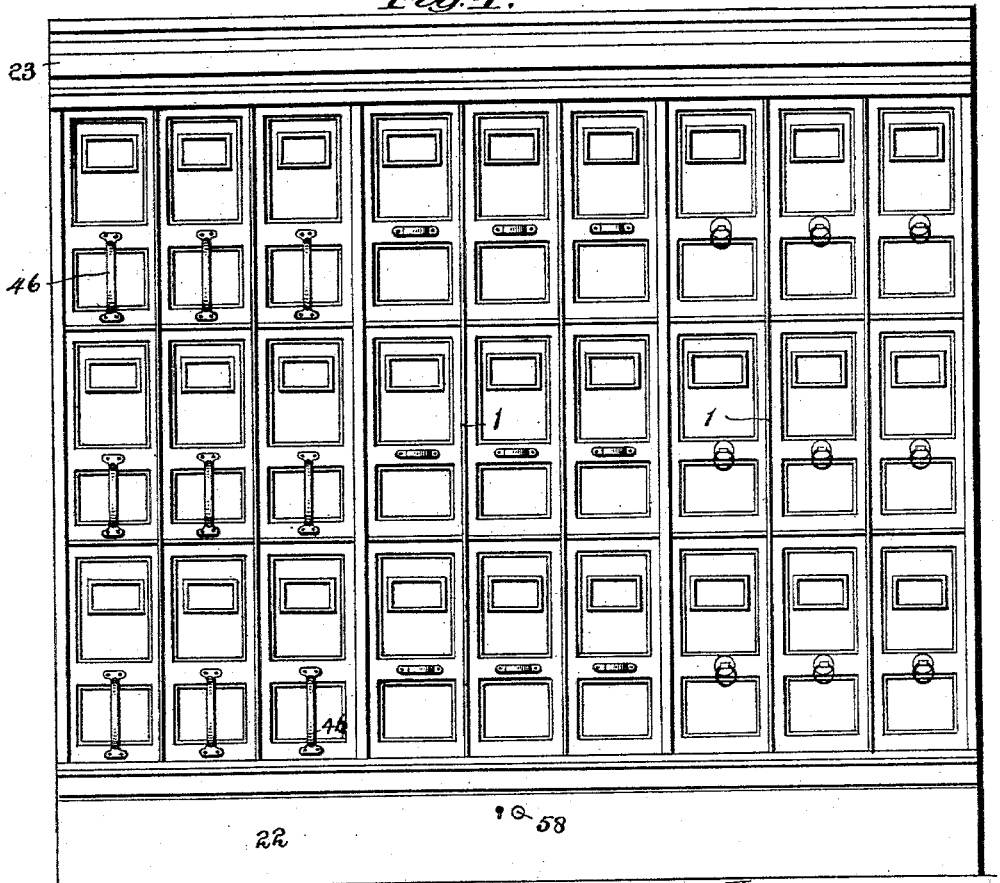
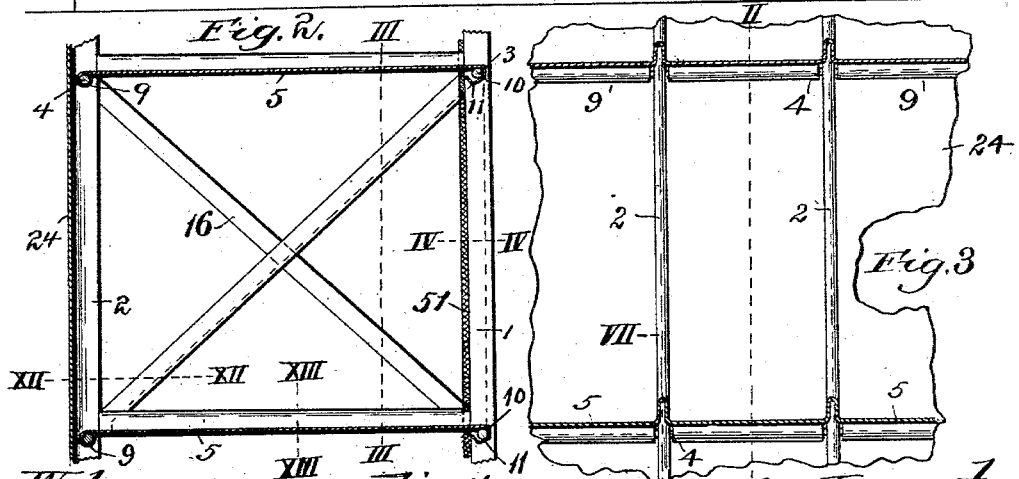
Witnesses:
J. B. McGinn.
J. E. Hutchinson.
Inventor:
E. W. Woodruff.
by Graham & Low
attys.

(No Model.) 5 Sheets—Sheet 2.
E. W. WOODRUFF.
BILL FILE.
No. 569,700. Patented Oct. 20, 1896.
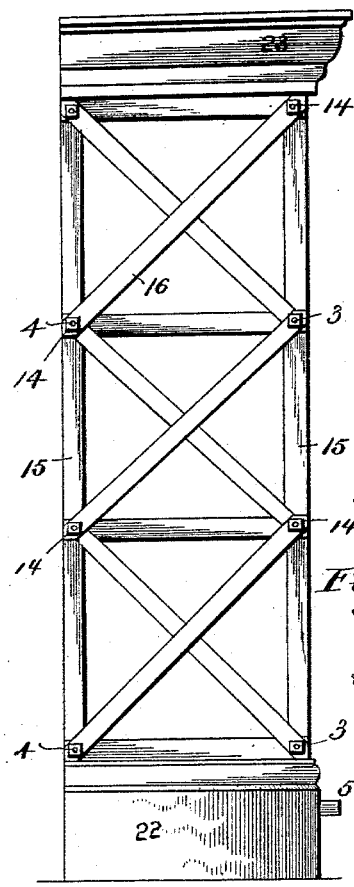
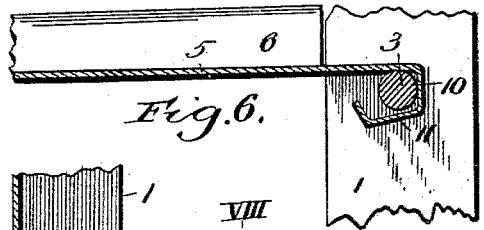
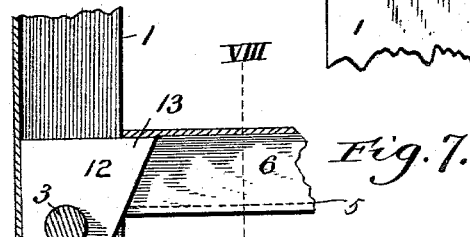
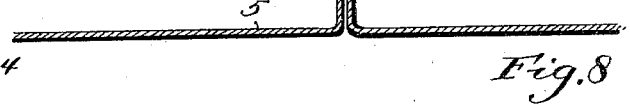
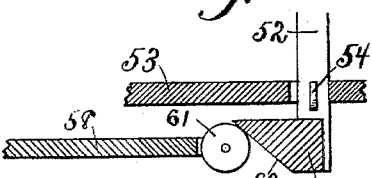
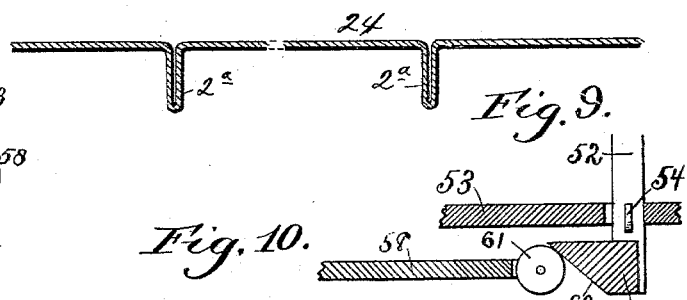
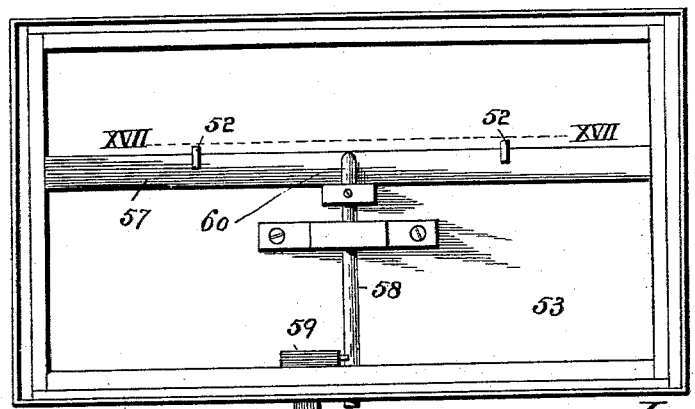
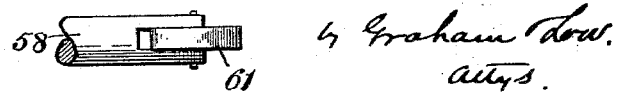
Witnesses:
J. B. McGirr.
J. E. Hutchinson.
Inventor
E. W. Woodruff.
by Graham Low.
attys.

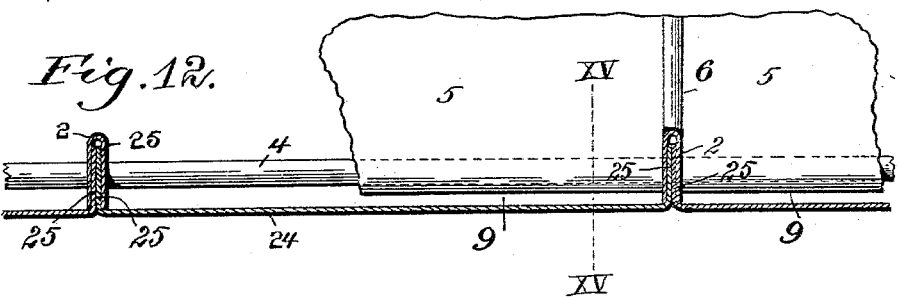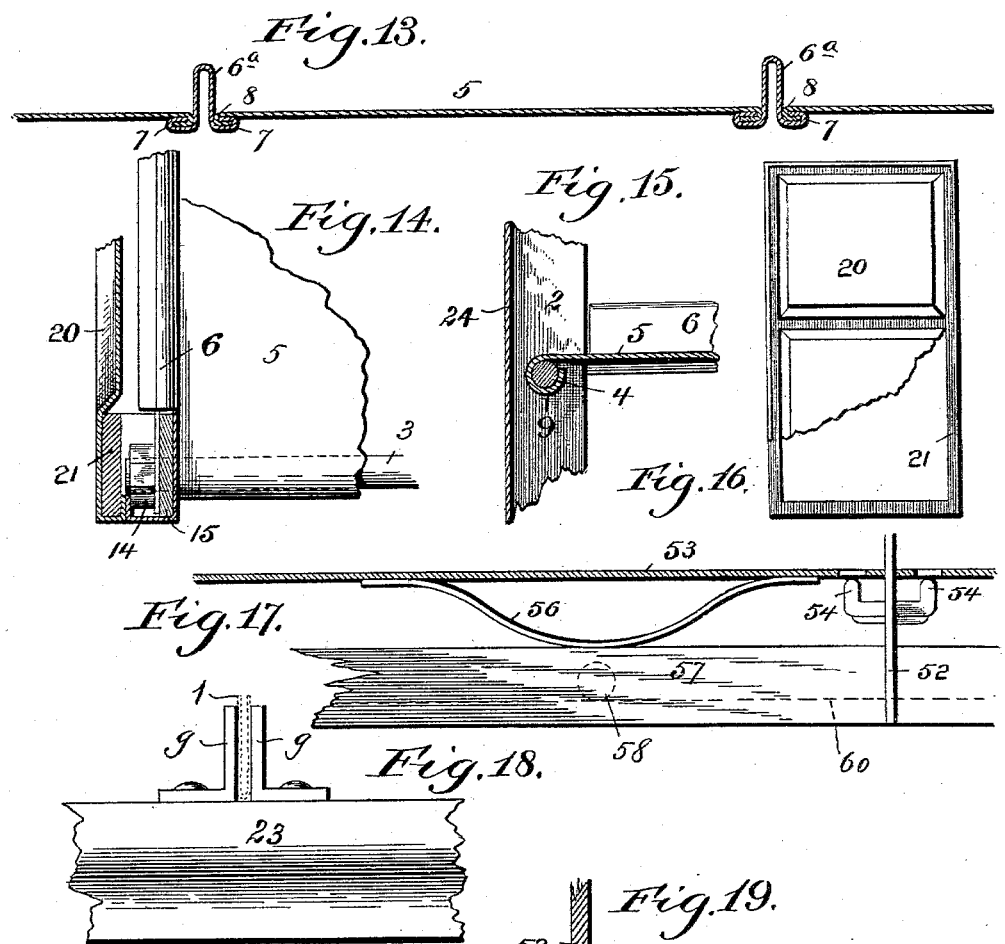

(No Model.)  5 Sheets—Sheet 4.
E. W. WOODRUFF.
BILL FILE.
No. 569,700. Patented Oct. 20, 1896.
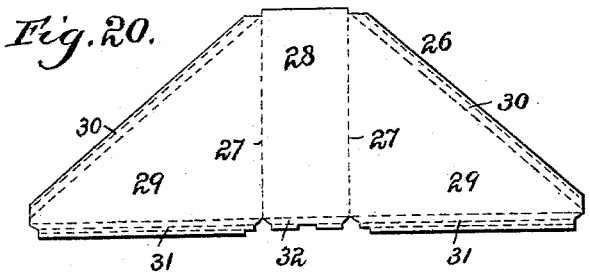
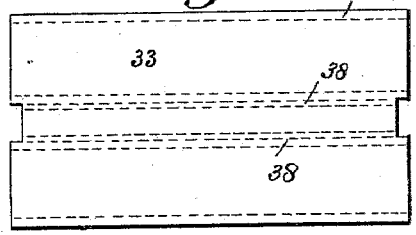
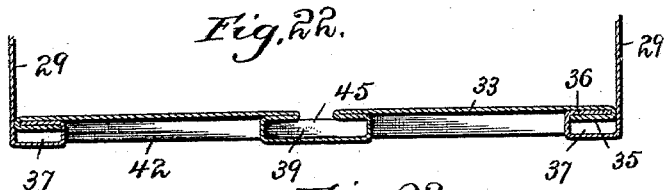
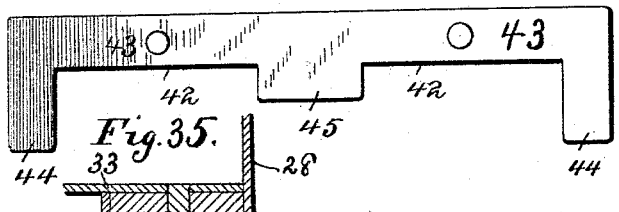
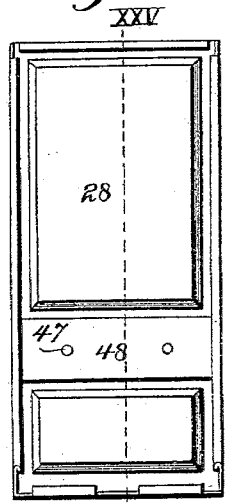
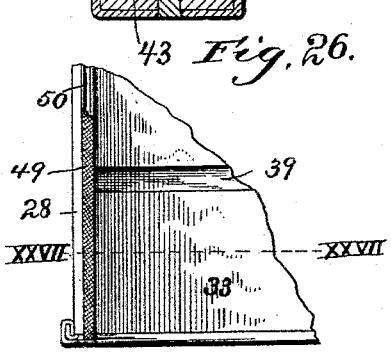
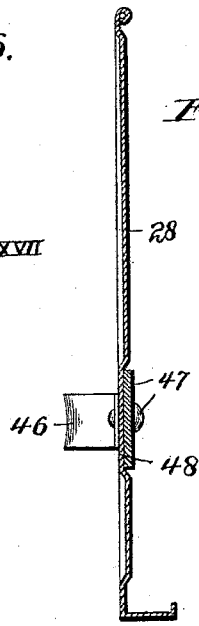
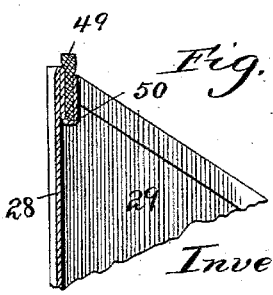
Witnesses:
Inventor:
E. W. Woodruff (No Model.) 5 Sheets—Sheet 5.
E. W. WOODRUFF.
BILL FILE.
No. 569,700. Patented Oct. 20, 1896.
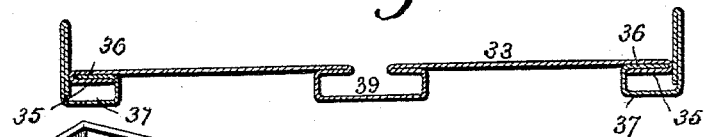
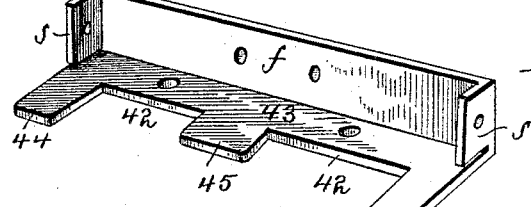
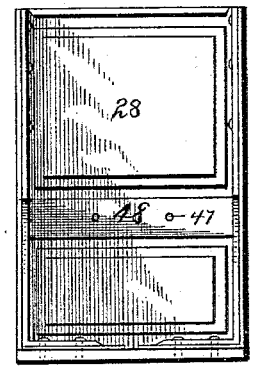
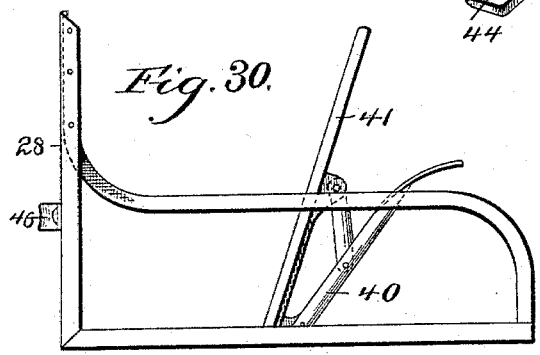
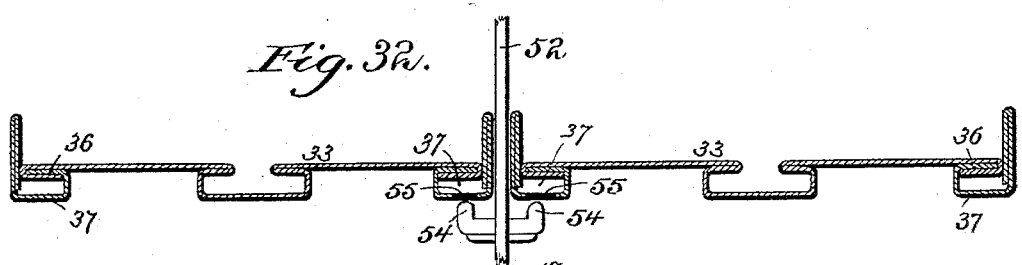
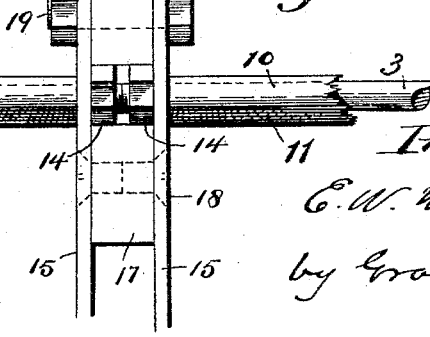

UNITED STATES PATENT OFFICE.

EDMUND W. WOODRUFF, OF WASHINGTON, DISTRICT OF COLUMBIA.

BILL-FILE.

SPECIFICATION forming part of Letters Patent No. 569,700, dated October 20, 1896.

Application filed August 22, 1895. Serial No. 560,119. (No model.)

*To all whom it may concern:*

Be it known that I, EDMUND W. WOODRUFF, a citizen of the United States of America, residing at Washington, District of Columbia, have invented certain new and useful Improvements in Bill-Files, of which the following is a specification.

It is one of the principal objects of my invention to provide a bill-file, otherwise known as a "file-holder" or "file-box," of improved construction, having in view to increase the simplicity and economy of construction of the file, its convenience and efficiency in use, and the readiness with which any desired number of the files may be assembled and kept in order for the purpose of their easy removal and the examination and use of their contents.

Further objects of my improvements are to more perfectly exclude dust and to securely lock the files against forward movement.

With such objects in view the invention consists in the parts and combinations thereof hereinafter more particularly set forth and claimed.

In order to make the invention more clearly understood, I have shown in the accompanying drawings means for carrying it into practical effect, without limiting my improvements in their useful applications to the particular construction which for the sake of illustration I have delineated.

In said drawings, Figure 1 represents three tiers of bill-files and means for supporting the same in order so that they are readily removable, the whole embodying my invention. Fig. 2 is a vertical sectional view of one of the supporting pigeonholes or compartments for the files on line II, Fig. 3. Fig. 3 is a sectional view of a central compartment and portions of the contiguous compartments on line III, Fig. 2. Fig. 4 is a sectional view on line IV, Fig. 2. Fig. 5 is an end elevation of the supporting pigeonholes or compartments shown in Fig. 1 with the end covering or casing plate removed. Fig. 6 is a sectional view, on a larger scale and on the same plane as Fig. 2, showing the connection between the bottom plate of one of the pigeonholes and its front supporting means. Fig. 7 is a similar view on line VII, Fig. 3. Fig. 8 is a sectional view on line VIII, Fig. 7, showing, however, two contiguous shelves as formed in one piece with the guide bent up therefrom. Fig. 9 is a horizontal sectional view of a back plate for the pigeonholes, illustrating how it may be bent to strengthen and stiffen it and form uprights. Fig. 10 is a bottom plan view of a series of pigeonholes, illustrating the means for locking the files in place. Fig. 11 is a detail view of a portion of the longitudinal sliding rod of the locking means and showing the same provided with an antifriction-roller. Fig. 12 is a horizontal sectional view on line XII, Fig. 2. Fig. 13 is a vertical sectional view on line XIII, Fig. 2. Fig. 14 is a horizontal sectional view taken at one corner of the series of pigeonholes or supports, illustrating the manner of attaching the end covering-plate. Fig. 15 is a vertical sectional view on line XV, Fig. 12. Fig. 16 is an end view of the end covering-plate of the pigeonholes and its supporting-frame on a smaller scale. Fig. 17 is a sectional view on line XVII, Fig. 10. Fig. 18 is a view of a portion of the cornice and its means of attachment. Fig. 19 is a vertical sectional view of one of the locking-rods for the files, showing a pair of its locking projections. Fig. 20 is a plan view of a blank cut to form the front and sides of a file, showing by dotted lines the manner in which the same is to be bent. Fig. 21 is a view of a blank cut to form the bottom plate of a file, showing by dotted lines the manner in which the same is to be bent. Fig. 22 is a vertical transverse section of a portion of a file, showing the bottom plate and the manner in which the side plates are united therewith. Fig. 23 is a plan view of a stiffening and connecting bar which aids in uniting the bottom and side plates of the file at the front or rear end or at both. Fig. 24 is a rear view of the front plate of a file. Fig. 25 is a sectional view on line XXV, Fig. 24. Fig. 26 is a plan view of a portion of the front end of a file. Fig. 27 is a sectional view on line XXVII, Fig. 26. Fig. 28 is a sectional view showing a bottom plate suitable for that form of file illustrated in Fig. 30, also embodying my invention. Fig. 29 is a perspective view of the stiffening and connecting bar in its preferred form when used with that form of file shown in Fig. 30 in uniting the front and bottom plates. Figs. 30 and 31 are side and rear views of a file embodying my invention, in which side bars are employed in place of continuous side plates. Fig. 32 is a transverse vertical sectional view of the bottom portions of two files, showing also a part of their locking mechanism. Fig. 33 is a front view illustrating the means for uniting two contiguous sections of pigeonholes or holders for the files. Fig. 34 is a vertical sectional view of means for operating the locking devices, including the roller shown in Fig. 11. Fig. 35 is a vertical longitudinal sectional view showing the union of the base and front plates of the file-box with their stiffening-bar.

Referring to the drawings, the supporting means for the files comprise front and rear uprights 1 and 2, which are U-shaped in horizontal cross-section, as illustrated in Fig. 4. The uprights 1 have their open edge directed inward, while the open edge of the rear uprights 2 is preferably directed outward, or toward the back of the cabinet, as seen in Fig. 12, to receive the flanges of the back plate or plates. Said uprights are connected together by transverse horizontal front and rear rods 3 and 4, which pass through perforations in the uprights and are of a length sufficient to unite and support such number of pigeonholes or compartments as may be desired. In the construction illustrated each section of compartments is composed transversely of three pigeonholes. Upon the front and rear rods 3 and 4 are supported the bottom plates 5 of the compartments, integral with each other, Figs. 3 and 8, and bent to form guides 6, which preferably extend above the plates 5 to form guides for the files as they are inserted in the compartments or connected with one another by horizontal U-shaped members 6ª, which interlock by flanges 7 with corresponding flanges 8, formed on the side edges of the bottom plates. The bottom plates thus serve to space the uprights 1 and 2, extending along the sides of said uprights, as indicated in Figs. 2, 6, and 12. At their rear edges the plates 5 are bent around the rods 4, Figs. 2 and 15, as indicated at 9, while their front edges are supported upon the rods 3 by means of bends or flanges 10, having inclined faces 11, Fig. 6, for a purpose hereinafter described. The front and rear ends of the members 6 abut against the uprights 1 and 2 and may be sufficiently supported by means of the bottom plates or shelves 5; but I prefer to strengthen the structure by giving to the members 6 additional supports, which also serve to prevent their lateral movement. The preferred form of such additional support is shown at 12 in Fig. 7, in which they consist of blocks 12, of wrought metal or other strong material, perforated so that they may be held upon the rods 3 or 4, situated within the U-shaped space of the uprights and having projecting tongues 13, which extend within the U-shaped space of the members 6, (or 6ª,) so as to support the latter both vertically and sidewise.

On account of the manner in which the various parts of this structure are shaped and combined together it may be made very light and cheaply, the parts 3 and 4 being of wrought metal of comparatively small dimensions and the parts 1, 2, 5, and 6 of comparatively thin sheet metal, such as iron.

The ends of the rods 3 and 4 are screw-threaded to receive clamping-nuts 14, Figs. 5, 14, and 33, which serve to firmly unite all parts of a section of compartments. At the outer ends of each section I prefer to substitute for the U-shaped sheet-metal uprights 1 and 2 uprights 15 of a stronger and more rigid character, for instance, such as wrought-iron bars, Figs. 14 and 33. At suitable points, such as at the ends of each section, I prefer to brace the structure diagonally by tension-strips 16, Figs. 2 and 5, of thin sheet metal, perforated at their ends, so that they may be slipped over the rods 3 and 4 and held beneath the nuts 14.

Where it is desired to provide for holding a greater number of files than can be accommodated in a single section of compartments, (in the construction illustrated such section being shown as adapted for nine files,) I unite two more of the sections end to end. This I prefer to accomplish as indicated in Fig. 33, in which the end bars 15 are spaced apart by blocks 17, to or against which they are held by screws 18 or bolts 19, or both. In this way the sections may be united with each other and the filing apparatus built up almost indefinitely, according to the number of files to be accommodated.

As a finish at the ends of the complete structure, I employ plates 20, Figs. 14 and 16, which may be bent to form panels or otherwise ornamented. These plates are stiffened by wrought-iron frames 21, over which the edges of the plate 20 may be bent, the whole being united by screws or in any other suitable way with the uprights 15.

The entire structure may be provided with a base 22 and an ornamental top or cornice 23 of any preferred form, Figs. 1 and 5.

The structure is preferably inclosed at the back, and this may be effected in various ways by a plate or plates 24, secured in place in any desired manner. I find it convenient to employ a number of said plates, formed at their edges with vertical flanges 25, Fig. 12, through which flanges the rods 4 are passed, and which are held in the U-shaped spaces of the uprights 2. I may, however, use a single back plate for each section of pigeonholes, bending it to form uprights 2ª, which may take the place of the uprights 2, Fig. 9. The cornice, and the base also, if desired, may be adapted to engage the uprights of the pigeonholes by lugs g, Fig. 18.

The blanks for the file are indicated in Figs. 20 and 21. 26 is the blank from which are formed the front and side portions of the file. It is preferably cut from sheet-iron or other suitable material in the form indicated in Fig. 20, being adapted to be bent upon the lines 27 to form the front plate 28 and the side plates 29, the latter being preferably of triangular shape, as shown, and lying, after such bending operation, at right angles to the front plate. The inclined edges of the sides 29 are bent upon the dotted lines 30 to form a finish or bead upon said edges, and on the lines 31 the bottom edges of the sides are bent so as to be united with the side edges of the bottom plate. Upon the lines 32 the bottom of the front plate 28 is bent so as to be united with the front edge of the bottom plate.

In Fig. 21 is illustrated the blank for the bottom plate 33, the side edges of which are bent upon the lines 34 to form a horizontal locking-flange 35, Fig. 22, which engages a corresponding outwardly-turned flange 36, formed upon the lower edges of the plates 29 by bending upon the lines 31, as already mentioned. These latter bends form at the lower side edges of the file hollow strengthening and supporting ribs 37, as seen in Fig. 22. At its middle portion the plate 33 is bent upon the lines 38 to form a central undercut groove 39, as also illustrated in Fig. 22, within which groove may engage the base of the clamp or lever 40, which supports the file-board 41. A known form of lever and file is illustrated in Fig. 30; but it will be understood that any suitable character of these devices may be employed with my improved file.

For the sake of strengthening and stiffening the file I prefer to combine with the parts 26 and 33 a connecting-bar 42, Figs. 23 and 29. This bar preferably comprises a transverse portion 43, adapted to extend across the front or rear lower edge of the file and to be included wholly or partially by the bent front or rear edge of the plate 33. It further comprises inwardly-extending tongues 44, adapted to enter within the hollow ribs 37, and a central rearwardly-projecting tongue 45, adapted to fit within the central undercut groove 39. I prefer to form the stiffening-bar employed at the front of the file with upwardly-extending front and side portions *f s s*, adapted to engage the lower part of the plate 28, and which may be perforated for rivets. The part *f* serves as a backing-plate for the attachment of the handle 46 of the file, Fig. 1. When the parts forming the file are thus assembled, they may be united by rivets or in any well-known manner. The front plate 28 of the file is preferably bent to form panels or other ornamental surface, as indicated in Figs. 24 and 25. The handle 46, by which the file may be withdrawn or replaced, may be of any well-known form. It is preferably attached to the front plate 28 by means of rivets 47 and a back bar 48, Figs. 24 and 25, lying behind the front plate of the file, or by the aid of the stiffening and connecting flange *f*, as already mentioned.

The exclusion of dust from the contents of the file is an important matter. So far as the closing of the crack or space between the top of the plate 28 and the upper side of the compartment or pigeonhole is concerned I may accomplish it by a strip 49, of felt, rubber, or equivalent material, seated in a groove 50, formed in the top edge of said plate, Figs. 26 and 27, which strip will closely engage and fit the inclined surface 11, already described, Figs. 2 and 6. The cracks or spaces at the sides of the file are preferably closed by packing-strips 51, Fig. 4, which may be of tubular form, having their edges secured in the U-shaped space of the uprights 1, as by rivets *r*.

The file and the holding or supporting means for the same being constructed as above described, or in any equivalent manner, I prefer to lock the files in place by the following means: 52 indicates vertically movable or reciprocating uprights or slides situated in the spaces between contiguous file-compartments. For this purpose the ribs or guides 6 and the bottom plate 53 of the pigeonholes are cut away to form orifices, in which the uprights 52 fit and are vertically guided, Fig. 19. I am thus enabled to lock two vertical rows or series of files by the same upright 52, arranging the latter only in the alternate spaces between the files or pigeonholes. This arrangement is illustrated in Fig. 32, the upright 52 being provided with projections 54, which extend upward and are adapted to enter openings 55, formed in the files and preferably in the hollow ribs 37. The uprights 52 are normally held depressed by a spring 56, Fig. 17, bearing upon a horizontal transverse bar 57, to which the uprights 52 are attached, Fig. 10. This bar may be moved upward in any known or desired manner by a rod or shaft 58, extending to the front of the apparatus and adapted to be secured by a lock 59. The under surface 60 of the bar 57 being beveled, the rod 59, which engages it at the inner end, (preferably through the medium of a roller 61, Fig. 11,) is adapted by a direct inward movement to elevate the bar and the locking devices connected therewith.

What is claimed is—

1. In a bill-file the combination with the file proper, of supporting means for the same consisting of independent front and rear uprights, transverse rods passing through the front and rear uprights and shelves carrying bent U-shaped file-box guides and directly engaging and spacing said uprights and supported on said rods, substantially as set forth.

2. In a bill-file the combination with the file proper, of supporting means for the same consisting of uprights, transverse rods, and shelves bent to engage the rods and carrying longitudinal bent U-shaped guides for the files, substantially as set forth.

3. In a bill-file the combination with the file proper, of supporting means for the same consisting of U-shaped uprights, transverse rods, and shelves having on their upper sides bent U-shaped guiding-ribs abutting the uprights, the shelves being bent to engage the rods, substantially as set forth.

4. In a bill-file the combination with the file proper, of supporting means for the same consisting of U-shaped uprights, shelves supported thereon, and back plates having flanges entering the rear uprights, substantially as set forth.

5. In a bill-file the combination with the file proper, of supporting means for the same consisting of upright parts, transverse rods carried thereby, shelves resting on said rods, and bent guiding-ribs 6ª engaging the edges of and uniting said shelves, substantially as set forth.

6. In a bill-file the combination with the file proper, of supporting means for the same consisting of U-shaped uprights, transverse rods, shelves engaging the latter and having hollow longitudinal ribs, and blocks on said rods and within the uprights and ribs, substantially as set forth.

7. In a bill-file the combination with the file proper, of supporting means for the same consisting of uprights, transverse rods, and shelves bent at their front edges to pass down in front of the rods and thence downwardly and rearwardly to form inclined elastic tongues having the inclined surfaces 11 for engagement by the file-box, substantially as set forth.

8. The combination with the compartment having a transverse rod and a shelf, the front edge of which is bent down in front of the rod and thence downwardly and rearwardly to form the inclined elastic part 11, of the file having the packing-strip 49 to engage said elastic part, substantially as set forth.

9. The combination with the files, of the supporting-compartments having U-shaped uprights 1, and the packing 51 held in the latter, substantially as set forth.

10. The bill-file consisting of the front plate, the bottom plate, and side pieces connecting the front and bottom, the side pieces being bent to engage said bottom plate and to form the hollow side ribs 37, substantially as set forth.

11. The bill-file consisting of the plate forming the front and sides, the bottom plate bent to form a longitudinal hollow rib or groove, and a stiffening connecting-bar engaged by the lower edge of the front plate and having a tongue entering said rib or groove, substantially as set forth.

12. The bill-file consisting of the plate forming the front and sides and bent to form the hollow ribs 37, the bottom plate engaging said ribs and bent to form the central groove 39, and the stiffening-bar having tongues entering said ribs and groove, substantially as set forth.

13. A bill-file of sheet metal having a hollow longitudinal rib 37 perforated as at 55 for the entrance of a locking projection, in combination with such projection.

14. The combination with the file proper, of supporting-shelves therefor having guiding U-shaped ribs 6, uprights 52 passing up through and guided by said ribs and having locking projections adapted to engage the file, and means for actuating and locking said uprights.

15. The combination with the files, of a section of compartments therefor, consisting of U-shaped uprights, rigid uprights 15 at the ends of the section, transverse front and rear rods passing through the uprights, shelves engaging said rods and having longitudinal guiding-ribs, diagonal tension-braces 16 at the ends of the section and engaging the ends of said rods, and end plates 20 having frames 21 secured to said uprights 15, substantially as set forth.

In witness whereof I have hereunto signed my name in the presence of two witnesses.

EDMUND W. WOODRUFF.

Witnesses:
H. N. LOW,
THOS. S. HOPKINS.